J. J. RALYA.
Water Purifier and Heater for Boilers.

No. 203,646. Patented May 14, 1878.

Witnesses:
Geo. T. Smallwood Jr.
Pennington Halsted

Inventor.
John J. Ralya.
By J. J. Halsted,
Atty.

UNITED STATES PATENT OFFICE.

JOHN J. RALYA, OF CLEVELAND, OHIO.

IMPROVEMENT IN WATER PURIFIERS AND HEATERS FOR BOILERS.

Specification forming part of Letters Patent No. 203,646, dated May 14, 1878; application filed January 17, 1878.

*To all whom it may concern:*

Be it known that I, JOHN J. RALYA, of Cleveland, in the county of Cuyahoga and State of Ohio, have invented certain new and useful improvements in apparatus for extracting lime from water and for heating and purifying the same for use in steam-boilers; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention is designed for use more especially in localities where well-water or very hard water is used for steam purposes. In many places, as is well known, the water is so much impregnated with lime and other substances which are injurious to boilers that it is almost impossible for that reason to use steam-power; and in other places the supply of water, whether hard or soft, is so limited as hardly to warrant the use of steam. By my invention I am enabled to overcome all difficulties of almost any locality in regard to the impurities of the water from which steam is to be generated, and much of the difficulty incident to a scanty supply.

To effect these ends, my invention consists in a mechanism, hereinafter described, whereby most of the water used is saved by condensation of the exhaust-steam, whereby the lime and other impurities are extracted from the water before it enters the boiler, and whereby the water is also highly heated before it is taken into the boiler, and a large saving effected in fuel.

Figure 1:
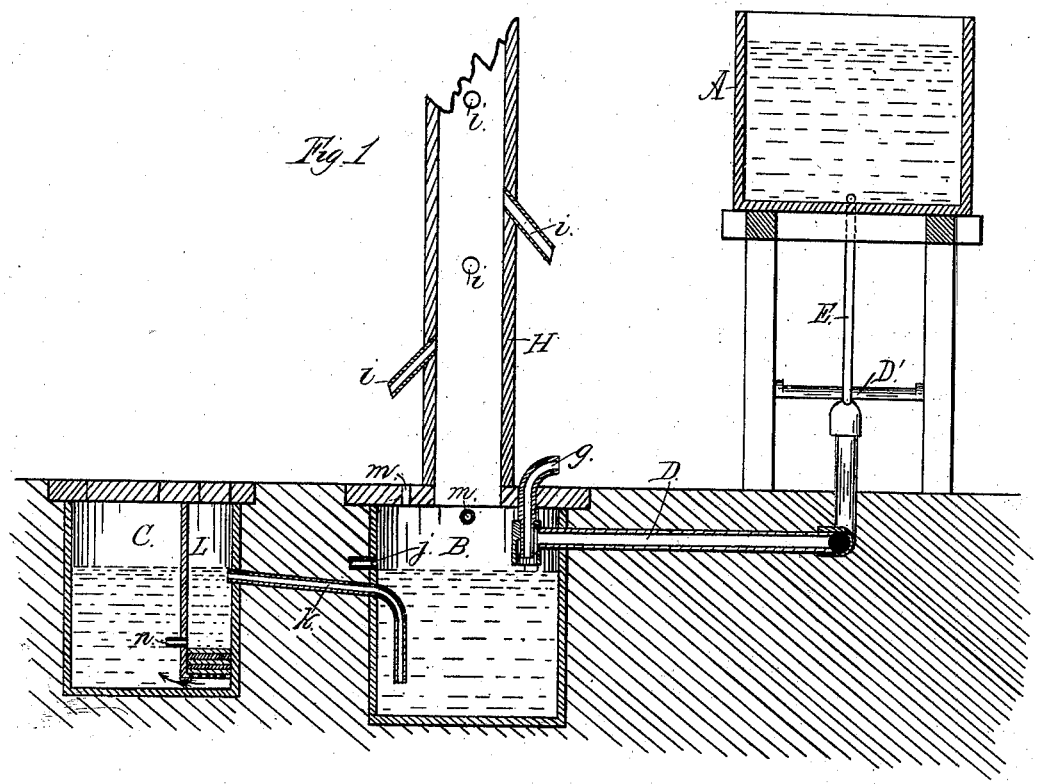
Figure 4:
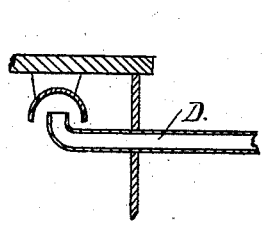
Figure 2:
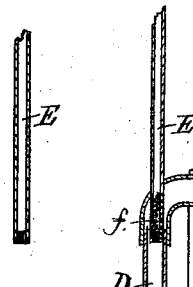
Figure 3:
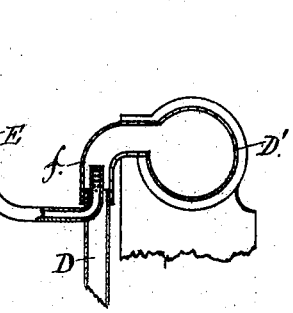

Figure 1 is a vertical section of an apparatus illustrating my invention as adapted for localities where there are no water-works or elevated supply of water, and where, consequently, the water has to be pumped up; Fig. 2, a vertical section through the cylinder, the water-supply pipe, and the exhaust-pipe; and Figs. 3 and 4 are modifications.

A is a tank, which may be supplied by pumping the water up from a well or from a stream; but such tank, of course, would not be needed where there is an elevated head of water at command, as in city water-works. This tank should, of course, be sufficiently elevated to insure the proper fall of water which is to enter the exhaust-pipe of the steam-engine without forcing it in.

B and C are cisterns built in the ground, and may be made of brick and cemented with water-lime, or of wood, or wood and iron, and of any suitable dimensions. The one, B, into which the steam is exhausted should be the larger of the two.

The water from the tank (or other supply, as the case may be) is introduced into the exhaust-pipe D, which leads from the engine to the cistern A, at a point as near as practicable to the cylinder D', and it enters it in the form of a spray, formed by a series of fine holes, $f$, made in the plugged or closed end of the supply-pipe E, or in the side of the pipe itself, the end being plugged, the object being to jet or spread the water in every direction outward into the steam within the exhaust-pipe, so that there may be a thorough intermingling or incorporation of the water with the steam. This shower or spray of cold water accomplishes two objects—viz, first, it condenses a very large proportion of the exhaust-steam; and, secondly, it takes up the heat that is lost or parted with by the steam, and becomes very hot indeed. This condensed steam and heated water are then conducted by means of pipe D into the first cistern, B, and it is discharged downward therein upon the surface of the water in such cistern, thereby heating that entire body of water and continuously acting to increase or to keep up a high degree of heat in said water, and at the same time, by striking the top or surface of the water, still increasing and continuing the further condensation of the steam.

The heating of the water sufficiently hot to cause a separation of all the impurities from the water and a precipitation of the same can also be effected by simply letting the exhaust-pipe extend into the side of the cistern, and allowing the steam and hot water therein to escape horizontally therefrom, or by allowing this steam and hot water to escape upward or in any direction against a surface placed at right angles to the end of the exhaust-pipe, or at any other angle that may accomplish the work of thoroughly intermingling steam and water, or by allowing the steam and water to escape upward or in any other direction into the mouth of a closed cap or bonnet, as shown in Fig. 4, and thus most thoroughly intermingle the steam and water.

Again, the first cistern alone may be used, and the water taken directly from this cistern to the boiler, the mouth of the suction-pipe extending into the water to a point sufficiently below the surface to avoid using any of the greasy surface, and also sufficiently above the bottom to escape pumping into the boiler any of the separated and precipitated impurities, such as lime, &c.; and the filter can also be introduced into this first cistern. I have used this method, but prefer the device in full, as shown in drawings.

A cold-air inlet-pipe, $g$, passing through the top of cistern or tank B, reaches down into the end of the exhaust-pipe D and terminates below its horizontal portion, but yet at a point above the outlet-mouth of such pipe D. The result of this construction is, that with the powerful exhaust of steam and water in the exhaust-pipe, this cold-air pipe $g$ acts as a strong air-pump, and with great force sucks in cold air at every exhaust of the steam, and thereby condenses the steam still more.

There is, as will be observed from the drawings, quite a considerable space between the water-line in the cistern B and the top of the cistern, and into this space inlets for cold air may be made for condensing more of the steam. I have shown for this purpose a large wooden exhaust or vent stack H. This stack may be round or square, or of any other shape, but must be large enough to overcome any back-pressure of steam in this cistern, and, in fact, to cause a vacuum or suction by its strong draft, and this really assists the engine and increases the condensation. Without this large stack there would be back-pressure. This stack H is provided also with a series of cold-air inlets, $i\ i\ i$, and the draft of this stack would cause a constant current of cold air to enter the inlets, made as above named, into the top of the cistern. All of these points of condensation combined condense nearly all of the exhaust-steam, so that the water is used over and over again, and always hot, and of course, therefore, all the fresh impurities must come only from the small amount of new and impure water that is introduced to take the place of the actual loss. I employ air-inlets $m\ m$, either in the top or in the sides of the cistern B, to admit air into the cistern above the water-line, and in some cases these may be such that I can dispense with the inlets $i\ i$.

The main difficulty hitherto in using the exhaust-steam for heating water for the boiler has been that all the lubricants introduced into the cylinder have, of course, escaped into the tank with the exhaust-steam, and this grease has, by some chemical action probably, become more or less acid in its nature, and it destroys the boiler in almost as short a time as the impure water, and sometimes is even quicker in its action, and always so when the water is not very impure.

It is also well known that the introduction of grease or oily substances into a boiler causes the water to foam, so that the attendant is unable to know actually how much water is in the boiler. The gage-cocks may indicate plenty of water when really the water may be dangerously low, and many explosions are caused in this way.

I provide an overflow-pipe, $j$, for running off this grease and acid from the surface of the water as often as it may be necessary, such pipe being located in the cistern wherever desired to perform this duty.

A pipe, $k$, connects the two cisterns B and C, and it has an elbow or downward bend, and is so located in the cistern, below the water-line and above the bottom of the cistern, that it never draws water from the surface nor from the bottom, and consequently neither the grease nor acid, nor any sediment or precipitated lime, nor any other impurity at either the top or bottom of the water in cistern B passes over to cistern C; but they are left in B, to be removed therefrom at any convenient time.

In the cistern C I place a filtering vessel or compartment, L, provided near its bottom with gravel and charcoal or other appropriate filtering material, arranged in alternate layers or otherwise properly disposed; and the pipe $k$ leads into this filtering-chamber L, the lower end of which does not reach quite to the bottom of the cistern, or else must be provided with a sufficient outlet or outlets, $n$, to allow the filtered water to escape at the bottom into the cistern. This tends still further to purify the water before it is taken into the boiler.

Appropriate stop-cocks may be used, as desired, on the pipes.

The practical operation and result of the apparatus are that the foulest water has practically all its impurities extracted from it; that it is heated to a very high degree in the cistern C, and after it has passed through the filter it is as clear and clean as glass.

The sediment can be readily cleaned out of the cistern B when required.

The apparatus is very economical of fuel, saving nearly one half, and still more economical of water, saving nearly eighty per cent. of it; and the boiler is kept perfectly clean, as also all the pipes and connections. The danger of explosions is also materially lessened, which are so often due to overheating boilers when filled with scale. The life or durability of boilers is also lengthened by my invention, and there is also a great saving of money, and in the labor of repairing and firing the boilers and engine. Besides these advantages, the apparatus is simple and cheap, and has no complex or intricate mechanism, and requires no specially-skilled attendant.

I claim—

1. In combination with the exhaust-pipe D and with the cistern B, the cold-air tube g, leading from the outer air into the exhaust-pipe near its exit end, and terminating at a point above its mouth and above the surface of the water in said cistern, substantially as and for the purpose described.

2. In combination, the exhaust-pipe D, the cistern B, and the exhaust chimney or pipe H above the latter, and cold-air inlets i or m, or both, substantially as and for the purpose described.

3. In combination, the exhaust-pipe D, cistern B, chimney H, overflow pipe or opening j, pipe k, and filter L, substantially as and for the purpose described.

4. In combination, the exhaust-pipe D, cisterns B and C, chimney H, the connecting-pipe k, and filter L, substantially as and for the purpose described.

5. The combination, with the exhaust-pipe and water-showering pipe, and with the tank or cistern B, substantially as described, of the overflow-pipe j, the operation being such that the exhaust-steam of a boiler is condensed, and also serves to heat the water, as also to purify the same water for the supply of the boiler, and the combination serving to separate and to discharge the impurities therefrom.

In testimony that I claim the foregoing as my invention I affix my signature in presence of two witnesses.

JOHN J. RALYA.

Witnesses:
H. E. PRINDLE,
JOHN HIRSIUS.